United States Patent Office 3,244,639
Patented Apr. 5, 1966

3,244,639
METHOD OF PRODUCING A STABLE TITANIA-COATED SILICA SOL
Morris Mindick, Chicago, and Arthur C. Thompson, Oak Lawn, Ill., assignors to Nalco Chemical Company, Chicago, Ill., a corporation of Delaware
No Drawing. Filed Sept. 20, 1961, Ser. No. 139,372
6 Claims. (Cl. 252—313)

This invention relates to silica sols containing metallic oxide coated silica particles as a dispersed phase and the process of making them. More specifically, this invention relates to silica sols in which the dispersed silica particles are titania-coated, and provides a process for making these compositions in a highly stable form.

Titanium dioxide has long been known in the prior art as an extremely valuable inorganic compound for various industrial applications. Its high index of refraction accounts for superior opacity and hiding power relative to other compounds when used as a coating. This makes it useful, for example, as a white pigment. It has also been employed as an extender pigment, mordanting agent and as a dye-stripping compound. In particular, titanium dioxide is useful as a pigment in paint, possessing permanence, great opacity and hiding power per unit volume.

However, because of certain of its physical properties, titanium dioxide cannot be efficiently employed in various applications. For example, its extremely low dispersibility in water or low water absorption, makes it difficult or even impossible to be used in aqueous systems. The surface characteristics of titanium dioxide interfere with its attainment of the high order of deflocculation which is necessary in applications involving a water media. Titanium dioxide suspended in liquid tends to be flocculated in the presence of moisture. Moreover, the low surface wettability of titanium dioxide creates problems with its use in a great variety of industrial systems, necessarily involving the introduction of water. This property even prevents the dispersion of titanium dioxide in many oleoresinous vehicles. The relative insolubility of titanium dioxide in water, organic acids, dilute alkalis, and most inorganic acids, make it extremely difficult or even impossible, to uniformly combine it with hydrophilic as well as hydrophobic systems.

Also known in the art are hydrous titanium oxides which are amorphous masses normally expressed as $TiO_2 \cdot XH_2O$, where X may be varied over a wide limit. The problems inherent in titanium dioxide as discussed above also exist with respect to these amorphous masses. They too are insoluble in water, inorganic or organic acids and alkali. Only by resorting to the use of concentrated sulfuric acid or hydrochloric acid can they be solubilized for use. The problems inherent in the use of compositions containing such corrosive strong acids are quite evident.

Because of the relatively high cost of titanium dioxide or other derivatives, many other compositions have been investigated as substitutes for its many uses. White pigmentary substances having an average refractive index similar to that of titanium dioxide and/or its derivatives have often been employed. For example, silica, alkaline earth and aluminum silicates, alkaline earth carbonates and sulfates, magnesium silicates, etc., have been considered. These are inferior to titania since they prove to have substantially less opacity and/or are even less readily incorporated into the materials to be pigmented. Also, titanium dioxide excels because of its high refractive index, lack of color, physical and chemical stability and relatively low specific gravity. It remains one of the most effective inorganic pigment materials despite problems with its uniform dispersion in liquids.

Consequently it would be desirable to produce a low cost particle which would have all the inherent properties of a titanium substance, but yet may be readily dispersed in a multitude of aqueous or polar organic vehicles or solvents. It would be useful to produce titanium-containing compositions which possess all the desirable properties of titanium dioxide, and in addition are free from such disadvantages as lack of water wettability. These compounds could be used in a variety of applications where use of titania compositions was heretofore impractical.

The present invention is based upon the discovery that the silica component of silica sols may be coated with titania by means of a unique process. These titania-coated silica compositions can be made as the dispersed phase of a stable sol and in this form can be easily applied to industrial uses enumerated above in which titanium dioxide was formerly usable only with difficulty if usable at all.

It therefore, becomes an object of this invention to provide as novel compositions, stable sols which contain titania-coated silica particles possessing all the desirable inherent physical properties of particles of titanium dioxide itself.

A further object of the invention is to provide a simple and economic process for producing these titanium-containing silica sols.

Still another object is to furnish stable sols containing titania-coated silica particles, which sols are stable with use for long periods of time.

Yet another object is to furnish hydrophilic sols with silica particles which have coated thereon a sufficieent amount of titania to impart to them chemical properties of titania and certain desirable physical properties of pure titania.

A still further object is to provide titania-containing silica sols having aqueous or polar organic dispersion media, which sols may be subsequently used for various applications involving either hydrophilic or hydrophobic systems.

An additional object is to provide an economical source of titanium which may be easily and readily applied with commercial practicability in such industries as the paint, paper, plastics, rubber, ceramic and porcelain enamel industries.

Yet another object is to furnish titania-coated silica sols which may be affixed to filaments or synthetic or natural fibers so that a delusterizing effect is obtained.

Other objects will appear hereinafter.

In accordance with the invention, it has been found that titania-coated silica sols having new and improved, as well as novel, chemical and physical characteristics may be prepared by treating commercially available aqueous colloidal silica sols with a hydrolyzable organic titanium compound.

In its broadest aspects the invention comprises the method of producing stable titania-silica sols by slowly adding a hydrolyzable organic titanium compound to a silica sol which has been appropriately acidified to a pH at least below 2.0 and is maintained during the addition in this acid range. During the addition of the titanium compound the silica sol is preferably agitated very vigorously in order to prevent the resultant coated titania silica particles from coalescing and consequently precipitating out from the sol.

In order to produce titania-coated silica sols which are stable over long periods of time, it is preferred that the addition of the hydrolyzable organic titanium compound be made in incremental steps. Each separate addition is then followed by a heating step at temperatures from 50–100° C. in order to intimately fix the titania upon the silica and avoid build-up of unreacted titania with resultant uneconomical precipitation and/or gellation.

The silica sol has as its dispersed phase dense, spherical, discrete particles of silica and as its continuous phase a hydrophilic liquid. The resultant product consisting of titania-coated silica particles which make up the dispersed phase of the sol may range from 1.0 to 60% by weight of solids based on the total weight of the final sol. The pH of the final composition may be from 0.5 to 2.0.

Colloidal silica sols with which the titanium compounds are contacted are well-known materials, and are commercially available from several sources of supply. A typical group of commercially available silica sols that may be used in the practices of the invention are those silica sols sold under the name, Nalcoag. Typical sols of this type are presented below in Table I.

silica sols have an average particle size diameter of from 10–50 millimicrons. The silica concentration in the sols may be between 1.0 and 60% by weight silica expressed as $SiO_2$. Various methods for conveniently concentrating silica sols are well-known in the art and need no specific discussion here. The technique generally employed is a constant volume evaporation process. The more preferred silica sols useful in the invention are those which contain from between 10 and 40% by weight silica expressed as $SiO_2$. Most preferably the silica concentration ranges from 15–30% by weight. These concentrations of silica in the sol are desirable for use in the practices of this invention in order to more properly conduct the titania coating reaction which will be hereinafter more fully set forth.

While sols of the above listed type are useful as starting materials in conducting the reactions set forth below, it is more desirable to use silica sols which have been

TABLE I

| Silica Sol | I | II | III | IV | V |
|---|---|---|---|---|---|
| Percent Colloidal Silica as $SiO_2$ | 15 | 30 | 35–36 | 49–50 | 35 |
| pH | 8.6 | 10.2 | 8.6 | 9.0 | 3.5 |
| Viscosity at 77° F., cps | <5 | <5 | <5 | 20–30 | 6.5 |
| Specific Gravity at 68° F | 1.09 | 1.205 | 1.255 | 1.385 | 1.255 |
| Average Surface Area, M² per gram of $SiO_2$ | 330–430 | 190–270 | 135–190 | 120–150 | 135–190 |
| Average Particle Size Millimicrons | 7–9 | 11–16 | 16–22 | 20–25 | 16–22 |
| Density, #/gallon at 68° F | 9.1 | 10.0 | 10.5 | 11.6 | 10.5 |
| Freezing Point, ° F | 32 | 32 | 32 | 32 | 32 |
| $Na_2O$, Percent | 0.04 | 0.40 | 0.10 | 0.30 | 0.01 |

Other silica sols that may be used in addition to those above may be prepared by using several well-known conventional techniques. Perhaps, the most convenient method of making aqueous colloidal silica sols is described in Bird U.S. Patent 2,223,355, wherein a dilute solution of an alkali metal silicate is passed in contact with a cation exchange resin in hydrogen form, whereby the silicate is converted to a dilute aqueous colloidal silica sol. Silica sols of the type described by Bird are produced relatively dilute. They may be concentrated to concentrations which are more economically usable from the standpoint of shipping costs and ultimate process use, by employing the techniques described in either Bechtold et al. U.S. Patent 2,574,902, Bragg et al. U.S. Patent 2,680,720, or Parma et al. U.S. Patent 2,601,235. Another type of silica sol which may be used in the practice of the invention is described in the specification of Reuter U.S. Patent 2,856,302. While aqueous colloidal silica sols may be used it will be understood that other forms of colloidal silica may be employed, such as for instance, sols which contain a major portion of polar organic solvents. Said sols may be generically referred to as organosols, and are typified by the sols described in Marshall U.S. Patent 2,386,247. It is only necessary that the silica particles used can be dispersed colloidally in a hydrophilic substance, such as water or lower alkyl alcohols and other organic compounds possessing relatively high dielectric constants. However, if the hydrolyzable organic titanium compound is added to a substantially complete organo silica sol, at least one mol of water must be also added to the sol for every mol of titanium compound added. The water may be added before or after addition of the titanium compound.

Regardless of the method employed to produce the aqueous or colloidal silica organosols, it is desirable that said sols contain silica particles which are dense, amorphous, and have an average particle diameter which does not exceed 150 millimicrons. As evidenced by a reading of Table I, all the silica sols contemplated as starting materials have an average particle size diameter well below 150 millimicrons. Preferably, the starting further treated to insure stability of the systems after addition of the titanium salt.

When producing aqueous silica sols of the type described, for instance, in Bechtold et al. U.S. Patent 2,574,902, it is necessary to stabilize the sols by adjusting the silica to alkali metal ratio, expressed as $SiO_2:Na_2O$, so that it is at most 130:1 and preferably in the range from 70:1 to 100:1. These alkali metal containing sols have the disadvantage that they are not compatible with organic systems due to the fact that the salts present in the aqueous sol cause gelation or precipitation of the silica particles when the aqueous phase is exchanged for a polar organic substance. This can be avoided by use of "salt-free" aqueous silica sols as starting materials in the reaction with the titanium compounds. These "salt-free" aqueous silica sols have the added advantage of long stability. In addition, if it becomes desirable to replace the aqueous system with a polar organic liquid after the titanium has been coated upon the silica particles, or if one would prefer to employ polar organic liquids as the suspension medium of the silica particles, the use of such "salt-free" silica sols becomes requisite, to prevent a salt-out effect on the particles.

In order to avoid this salting-out effect it is therefore necessary that the causative cations be removed from the surface of the colloidally dispersed silica particles, and from the liquid phase of the sol. This may be readily accomplished by treating typical silica sols of the type described in Bechtold et al. U.S. Patent 2,574,902, with a cation exchange resin the hydrogen form and a strong base anion exchange resin in the hydroxide form. This treatment tends to produce a finished silica sol which we prefer to call "salt-free" sol. The particles of silica in such a sol are also considered as being "salt-free."

Typical commercially available silica sols which may be deionized as described above to give starting materials that will be subsequently modified by titania, are those silica sols which are sold by the Nalco Chemical Company as "Nalcoag" colloidal silica sols and which are described in Table I above.

To illustrate the deionization of the above type sols, the following is presented by way of example.

Example I

A silica sol corresponding to the 35% concentrated coloidal silica whose physical properties are enumerated in Table I, was decationized by passing the sol through a column of cation resin in the hydrogen form. The resin was Nalcite HCR which is described in U.S. Patent 2,366,007. Following this treatment the silica sol was passed through a strong base anion exchanger resin in the hydroxide form. In this instance the resin was a commercially available product known as Nalcite SBR which is described in U.S. Patent 2,591,573.

Sols deionized in accordance with the above technique will have a pH within a range of 2.7–4.0, a specific conductivity of between 100–500 micromhos/cm., and when the silica concentration is between 5% and 50% by weight the viscosity will range between 2 and 100 cps.

An important advantage derived by the use of a strong base anion exchanger in the hydroxide form in the deionization procedure described above is that the finished products are substantially free of $CO_2$ and low molecular weight forms of silicic acid. These deionized sols are stable, thereby allowing them to be prepared and stored well in advance of the subsequent treatment to which they are subjected in the process of this invention. They have a salt content expressed as $Na_2SO_4$, of less than 0.001%.

When the particle sizes of the silica sol are within the ranges specified, the silica particles present in the starting aqueous sol would have specific surface areas of at least 20 m.$^2$/g., with the specific surface areas being usually in excess of 100 m.$^2$/g. The specific surface area is important since it directly relates to the number of available reactive silanol groups which will be subsequently bonded to the titania which is reacted thereon.

Other preferred starting silica sols for use in the instant invention are those prepared by the method outlined in a commonly assigned co-pending application Serial Number 103,425, filed April 17, 1961, which is herein incorporated by reference. These sols produced by a "double deionization" method are normally much improved with regard to stability over those sols prepared by a single deionization step as outlined above.

Any commercially available silica sol may be employed as a starting sol in the "double deionization" method. The following example will serve to illustrate this method. The finished sol can then be utilized as starting materials to be subsequently coated with titania, as will be more fully shown below.

Example II

A two-drum (110 gallons) quantity of a commercially available 35% silica sol was deionized by passing the sol through a six inch diameter column containing 25 inches of a strong base anion exchange resin at the bottom of the column and 25 inches of a strong acid cation exchange resin at the top of the column. The strong base anion exchange resin was a commercially available product known as Nalcite SBR which is described in U.S. Patent 2,591,573. The strong acid cation exchange resin was the commercially available product Nalcite HCR which is described in U.S. Patent 2,366,007. The deionization of the sol was carried out at a flow rate of 0.75 g.p.m. (gallons per minute) which is equivalent to 5 g.p.m./ft.$^2$. A composite of the effluent from the column produced a product having a pH of 2.1 and a conductance of 650 mmhos. The low pH indicated that some acid leakage had occurred through the anion bed. After standing overnight, the material again was passed through the ion exchange unit. The composite of this material gave a pH of 3.10 and a conductance of 395 mmhos. This product is believed to be almost permanently stable.

The finished, acidic salt-free stable silica sols, as produced above, have as a continuous phase an aqueous liquid and as a dispersed phase discrete, dense, non-agglomerated particles of silica, which particles have a specific surface area of 50–800 m.$^2$/g. The pH of the sols ranges from 2.6 to 3.8 and the specific conductance is less than 1,000 micromhos/cm., at 77° C. The pH and conductivity are derived primarily from the dissociation of the acidic groups on the surfaces of the silica particles. Further, these sols are all characterized by maintaining a substantially constant pH over a one month storage period and may be said to be permanently stable at room temperatures.

As has been mentioned previously an essential element in the use of any of the aforementioned silica sols, is that they contain at least an amount of water sufficient to hydrolyze and help deposit upon the silica particles the quantity of the hydrolyzable organic titanium compound added to the silica sol. It is immaterial whether the organic titanium compound is added subsequent or prior to the addition of the requisite water in the sol. For example, the titanium compound may be added to a completely non-aqueous organosol and then water may be subsequently added to the agitated sol containing the titanium compound in order to hydrolyze the titanium compound contained in the sol and coat it upon the silica particles themselves. If, for example, a mol of hydrolyzable organic titanium compound is added to a non-aqueous silica sol, at least one mol of water must be subsequently added to hydrolyze the titanium compound and fix it upon the silica sol particles.

The hydrolyzable organic titanium compounds that can be used to coat the silica particles may be chosen from a wide variety of commercially available titanium containing compounds. As discussed above, they may be added to either aqueous or polar organic silica sols which are either "salt-free" or contain cations in the sol itself, with the only proviso being that if they are added to polar organic silica sols a molar amount of water equal to the number of mols of titanium compound added must later be also slowly added to the reaction mixture.

Such hydrolyzable organic titanium compounds as titanium alkoxides, aroxides, complexes, polymers and salts of organic acids may be used. Titanium compounds containing nitrogen or silica or those with titanium-carbon bonds are also useful. The preferred titanium compounds are titanium esters, with the tetraalkyl or tetraaryl esters being the most preferred. For example, tetramethyl titanate, tetraethyl titanate, tetraisopropyl titanate, tetra-n-butyl titanate, tetraphenyl titanate esters may be employed as examples of tetrasubstituted esters of titanium. A preferred starting material among these is tetraisobutyl titanate.

The following is a partial list of the organic hydrolyzable titanium compositions that may be used as starting materials.

ALKOXIDES AND AROXIDES $Ti(OC_4H_9\text{-sec})_4$
$Ti(OC_4H_9\text{-tert})_4$
$Ti(OCH_2CH_2OC_2H_5)_4$
$Ti(OC_5H_{11})_4$
$Ti(OC_5H_{11}\text{-tert})_4$
$Ti[OC(CH_3)_2C_2H_5]_4$
$(CH_2=CHCH_2O)_3TiOC_5H_{11}\text{-iso}$
$(CH_2=CHCH_2O)_2Ti(OC_5H_{11}\text{-iso})_2$
$(\text{Iso-}C_5H_{11}O)_3TiOCH_2CH=CH_2$
$(\text{Iso-}C_5H_{11}O)_3TiOC_3H_7\text{-iso}$
$(\text{Iso-}C_5H_{11}O)_3TiOC_2H_5$
$(\text{Iso-}C_5H_{11}O)_3TiOC_3H_7$
$\text{Iso-}C_5H_{11}OTi(OC_3H_7)_3$
$Ti[OCH(C_2H_5)_2]_4$
$Ti[OCH(CH_3)C_3H_7\text{-iso}]_4$
$Ti[OCH(CH_3)C_3H_7]_4$
$Ti(OCH_2C_4H_9\text{-sec})_4$
$Ti(OC_6H_4CH_3\text{-o})_4$
$Ti(OC_6H_4CH_3\text{-m})_4$
$Ti(OC_6H_4CH_3\text{-p})_4$
$Ti(OC_8H_{17}\text{-iso})_4$ ALKOXIDES AND AROXIDES—Continued Ti[OCH(CH$_3$)C$_6$H$_{13}$]$_4$
Ti(OC$_9$H$_{19}$)$_4$
Ti[OCH(C$_4$H$_9$)$_2$]$_4$
Ti[OCH(CH$_3$)CH$_2$CH$_2$CH(C$_2$H$_5$)C$_4$H$_9$]$_4$
Ti{OCH$_2$CH[CH(CH$_3$)CH$_2$C$_4$H$_9$-tert]-
    CH$_2$CH$_2$CH(CH$_3$)CH$_3$C$_4$H$_9$-tert}$_4$
(Iso-C$_3$H$_7$O)$_2$Ti[OC(CH$_3$)=CHCOCH$_3$]$_2$
(C$_2$H$_5$O)$_3$TiOC(CH$_3$)=CHCOCH$_3$
(C$_2$H$_5$O)$_3$TiOC(CH$_3$)=CHCOOC$_2$H$_5$
(C$_2$H$_5$O)$_2$Ti[OC(CH$_3$)=CHCOCH$_3$]$_2$
(C$_2$H$_5$O)$_2$Ti[OC(CH$_3$)=CHCOOC$_2$H$_5$]$_2$
(C$_3$H$_7$O)$_3$TiOC(CH$_3$)=CHCOOC$_2$H$_5$
(C$_3$H$_7$O)$_2$Ti[OC(CH$_3$)=CHCOCH$_3$]$_2$
(C$_3$H$_7$O)$_2$Ti[OC(CH$_3$)=CHCOOC$_2$H$_5$]$_2$
(C$_4$H$_9$O)$_2$Ti[OCH(CH$_3$)=CHCOCH$_3$]$_2$
(C$_4$H$_9$O)$_2$Ti[OCH(CH$_3$)=CHCOOC$_2$H$_5$]$_2$

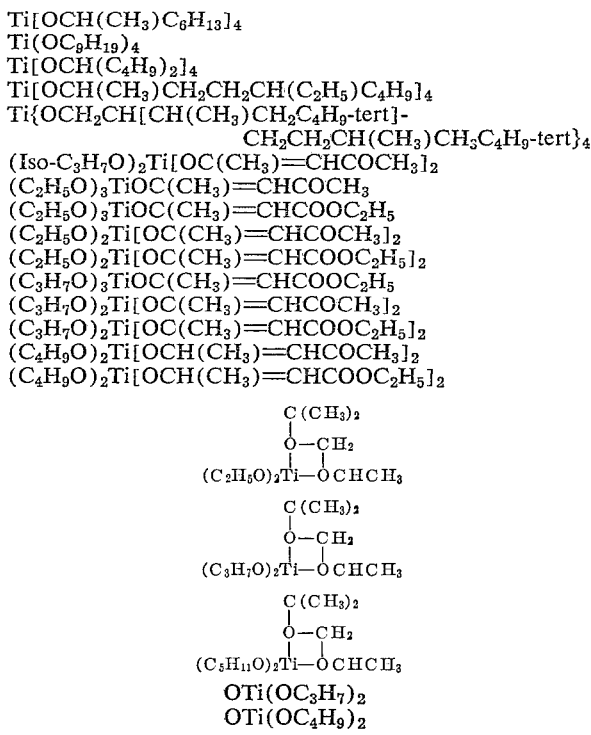

OTi(OC$_3$H$_7$)$_2$
OTi(OC$_4$H$_9$)$_2$

TITANIUM COMPOUNDS CONTAINING NITROGEN (TiCl$_4$)[HCON(CH$_3$)$_2$]
[Ti(OC$_4$H$_9$)]$_4$CH$_2$NHCH$_2$CH$_2$NH—CH$_2$CH$_2$NH

TITANIUM COMPOUNDS CONTAINING SILICA

Tetrakis(trimethylsilyl)orthotitanate
Tetrakis(dimethylsilyl)orthotitanate
Ti[OSi(C$_2$H$_5$)$_3$]$_4$
Ti[O$_5$Si$_4$(C$_6$H$_5$)$_8$]$_2$
Ti[OSi(CH$_3$)$_3$]$_4$

COMPOUNDS WITH TITANIUM-CARBON BONDS

α-C$_{10}$H$_7$Ti(OC$_4$H$_9$)$_3$
(C$_6$H$_5$)$_2$Ti(OC$_4$H$_9$)$_2$
Ti(OCH$_2$CH$_2$Cl)$_4$
Ti(OCH$_2$CH=CH$_2$)$_4$
Ti(OCH$_2$CH$_2$OCH$_3$)$_4$
(C$_4$H$_9$O)$_2$Ti(OC$_3$H$_7$)OCH$_3$
C$_4$H$_9$OTi(OC$_3$H$_7$)$_3$
(C$_4$H$_9$O)$_3$TiOC$_3$H$_7$
Ti(OC$_4$H$_9$-iso)$_4$

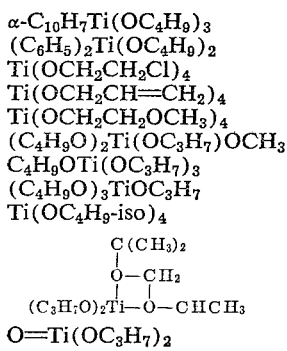

O=Ti(OC$_3$H$_7$)$_2$

TITANIUM POLYMERS (C$_2$H$_5$O)$_3$Ti[Ti(OC$_2$H$_5$)$_2$O]$_x$C$_2$H$_5$

TITANIUM SALTS OF ORGANIC ACIDS (RCOO)$_x$Ti(OR')$_{4-y}$ where
R' is butyl or isoamyl
R=3–18 carbon atoms in length While any hydrolyzable organic titanium compound may be used, the preferred compositions are those selected from the group consisting of tetraalkyl titanates and tetraphenyl titanates. Among these it is preferred that tetraalkyl titanate contain alkyl chains of less than 18 carbons and more preferably contain alkyl chains of less than 5 carbons.

While a critical feature of the titanium compounds employed as reactants in the invention is that they be capable of hydrolysis in order to be firmly affixed to the silica particles contained in the sol employed, nevertheless, it is not necessary that these titanium compounds be only monomeric types. Any titanium compound capable of further hydrolysis and reaction when added to the silica sol may be employed. It has been found that partially hydrolyzed organic titanium compounds capable of further reaction and polymerization upon subsequent hydrolysis may also be reactants in the invention.

Therefore, it has been found that partially pre-polymerized titanium compounds such as tetraalkyl titanates may effectively coat the silica particles with titania. For example, pre-polymerized tetrabutyl titanate ester may be employed without departing from the scope of the invention. These are commercially available under the trade name of "Tyzor" marketed by Du Pont.

A combination of partially hydrolyzed or hydrolyzable organic titanium compounds may also be employed as reactants in coating the silica particles. The pre-polymerized, partially hydrolyzed titanate esters may be combined with any other monomeric hydrolyzable organic titanium compound and subsequently coated upon the silica core particle.

PROCESS OF THE INVENTION

As broadly mentioned above, an acid silica sol is contacted with a hydrolyzable organic titanium compound and then heated from 50–100° C. The resultant titania-silica sol is then stable if maintained in this acid environment.

It is necessary during the coating reaction that the silica sol and the resultant titania-coated silica sol be stabilized by addition of some acidic substance which will lower the pH of the sol mixture to less than a pH of 2. Mineral acids such as hydrochloric acid and nitric acid, etc., are preferred. It may also be necessary to add additional acid to maintain the pH at or below this upper operable limit of 2.0. Preferably during the coating operation the silica sol is maintained at a pH of from 0.5 to 2.0 until the addition of the organic titanium compound is complete.

While suitable titania-coated silica sol may be produced by adding at once the entire amount of hydrolyzable titanium compound, and heating the resultant solution in one step, it is preferred that the additive titanium compound be divided into from 2–4 equal portions. Each of these portions is added separately to the silica sol and each addition is then followed by an independent heating step. The number of heating steps, of course, depends upon the number of incremental portions of titanium added and may vary from 2–4 in number.

Most preferably, the titanium compound to be added is divided into 3 equal amounts. Each portion is added separately to the silica sol and then followed with a heating step, the series of heating steps, of course, totaling 3.

Each of the above heating steps is effected at temperatures ranging from about 50–100° C. and more preferably from about 60–80° C. The duration of the heating may vary from ¼–3 hours and more preferably is carried out in from ½–2 hours.

The number of heating steps and corresponding incremental additive portions of titanium compound is directly dependent upon the amount of titania to be coated upon the silica particles. It has been determined that long-term stable titania-coated silica sols containing from 5–10% titania expressed as TiO$_2$ based on the weight of silica expressed as SiO$_2$ may be produced by only one heating step. If from 10–20% titania is desired to be coated upon the silica, 2 heating steps are preferred. Lastly, if over 20% titania coating is desired, at least 3 heating steps following each addition of equal portions of hydrolyzable titanium compound are preferable.

During the addition of the titanium compound it is preferred to vigorously agitate the silica sol with appropriate means. Mixing equipment similar to that of a Waring Blendor may be employed with good results. The addition time of the titanium compound may vary depending upon the size of the particular batch. Usually the addition time varies from 5 to 60 minutes. Agitation may be effected by the appropriate machine with blades revolving at from 500 to 3000 r.p.m. The agitation may continue for up to one hour after complete addition of the titanium compound but it preferably is completed in from 1 to 10 minutes.

The hydrolyzable titanium organic compound may be added as such i.e. in its natural physical form or it may be solubilized in the appropriate organic solvent in which it is non-reactive. The solvent employed as a carrier for the titanium compound must necessarily be free from any traces of water in order to prevent substantial hydrolysis and prior polymerization of the titanium compound before it is contacted with the silica sol. Such common solvents as methanol, ethanol, isopropyl alcohol, butanol and other polar organic alcohols may be used as solvents. Benzene, toluene, xylene, etc., may also be appropriate solvents.

If the above method is followed, titania-coated silica sol may be produced which have as their dispersed phase, titania-coated silica particles in the amount of from 1.0% to 60% of the weight of the final sol. Water or any organic polar liquid may be used as the starting continuous phase of the silica sol or may be later introduced into the system. Mixtures of the above may also be readily employed. In addition, the final compositions may be concentrated by evaporating the solvent by such well-known techniques as evaporation, etc.

CALCULATION OF REQUISITE HYDROLYZABLE ORGANIC TITANIUM COMPOUND TO OBTAIN COATING

To calculate the total amount of titanium compound which is necessary to be added to the silica sol in order to obtain the requisite amount of titanium coating, the following formula was devised. Since the amount of titania coated upon the silica is expressed as $TiO_2$, the calculation must include as a factor the proper molecular formula relation between the titanium compound and $TiO_2$. Equation I below may be used if the particular titanium compound is a liquid. However, if the titanium compound is a solid, the weight required can be calculated by omitting the density factor in Equation I.

The equation used is as follows:

*Equation I*

$$\text{Volume of titanium compound required} = 100 \times \frac{\frac{\text{Molecular wt. titanium compound}}{\text{Molecular wt. } TiO_2} \times \frac{\text{Wt. of } TiO_2 \text{ required}}{\text{Density of titanium compound}}}{\text{Percent purity of titanium compound}}$$

THE COMPOSITIONS OF THE INVENTION

Using the process described above in any of its modifications, a titania-silica sol comprising a hydrophilic liquid as the continuous phase and as the dispersed phase, discrete particles of colloidal silica coated with titania may be produced so that the weight of the titania expressed as $TiO_2$ is from 5.0 to 60% based on the weight of silica. Preferred products are sols containing from 10 to 40% $TiO_2$. Most preferably the weight of the dispersed phase is from 20 to 35% of the total weight of the sol. The pH of the final sol may range from 0.5 to 2.0.

In all cases the discrete particles of colloidal titania-coated silica have an average particle size of less than 250 millimicrons.

The continuous phase of the final composition may be water or any polar organic compound which contains minor amounts of water. The sol itself may be essentially salt-free or contain varying amounts of cations.

It has been calculated that roughly 13% of $TiO_2$ based on the weight of $SiO_2$ is necessary to compeltely cover the silica particles having a diameter of 20 millimicrons with at least a mono-molecular layer. This figure varies inversely with the particle diameter. However, due to the steric hindrance of the relatively large titania molecules, practically speaking, only ½ of this theoretical amount is necessary to effect complete coating of the silica particle. Addition of titanium above this amount usually produces multi-molecular layers of titanium about the core of silica particles.

Titanium being an element in Group IVa has valence electrons existing in the $3d$ and $4s$ subshells. Since titanium has unfilled $4s$ and $3d$ subshells, its electronic configuration does not lead to structure similar to those of elements of Group IV. The configuration of titanium does not permit ready formation of metal to carbn type bonds as do those metals of Group IVb.

Instead it is believed that the titanium forms a Ti-O-Si type of bonding with the silica particles. Once a monolayer of titanium has been built around the silica particle, subsequent addition of titanium leads to a Ti-O-Ti type bond until the source of the titanium atom added had been exhausted.

Electron microscopic studies of the titania-coated silica sols revealed that the sols are not merely mixtures of titania and silica. Close study through the use of the microscope shows discrete, dense particles having a size equal to the volume of both the original silica plus the titania added. If the sols merely contained mixtures of the two additives, namely titania and silica, there would predictably be an irregular random distribution of variously sized particles of the two starting materials in the sol.

The following examples are illustrative of the type contemplated in the invention, without being restricted thereto.

Example III

A 35% salt-free aqueous silica sol was prepared by the method outlined in Example II. 122 milliliters of this sol was diluted to a volume of 500 milliliters with water. To this acidic sol was added 80 milliequivalents of hydrochloric acid and 53 milliliters of tetrabutyl titanate, the latter being diluted to 250 milliliters with isopropyl alcohol. The total addition of acid and titanate was made in 3 equal incremental additions over a period of 4 hours. The acid addition served to maintain the pH at about 0.8. After each addition the sol was slowly heated to 80° C. and then allowed to cool to 60° C. before the next addition. The finished titania-coated silica sol which contains 26% titania based on the weight of silica, was a clear sol, showing no tendency whatsoever to gel upon standing. The final pH of the titania-silica sol was 0.8.

Electron micrographs of the above sol show spherical particles of uniform size only slightly larger than those of the starting silica sol.

Example IV

This example was run similarly to the procedure outlined in Example III with the exception that only 32% of the amount of titania and hydrochloric acid added in Example III to the 35% aqueous salt-free silica sol was added in the instant experiment. Only one heating step was necessary to effect stable sol formation. The time of heating was 1 hour. The final titania-coated silica sol contained 8.3% titania based on the weight of silica.

Example V

This example was also performed similarly to that of Example III except that only 64% of the titania and hydrochloric acid used in Example III was employed in the instant run. The titania and hydrochloric acid was divided into two equal portions. The first portion was added to the silica sol and the resultant solution slowly heated over a period of 1⅓ hours from 50° to 80° C. After this period of time the sol was allowed to cool to 60° C. The remaining portion of titanium compound and hydrochloric acid was then added and the sol heated from 60–80° C. for another 1 and ⅓ hour. The resultant final product was a stable titania-coated silica sol containing 16.6% titania based on the weight of silica.

*Example VI*

This example was run similarly to the procedure outlined in Example III with the exception that all the titania and hydrochloric acid was added at once and no heating was effected. A faintly blue transparent sol was first formed which within 3 hours standing at room temperature reverted to a translucent thixotropic gel.

The above example points out the need for at least one heating step in order to produce titania-coated silica sols of sufficient stability.

*Example VII*

The procedure of Example III was run except that the amount of hydrochloric acid was adjusted to maintain a pH of 2.8. Large agglomerates of both titania and silica were formed which rapidly settled from the reaction mixtures. Efforts to form a true sol by agitation, further acid addition and application of heat were unsuccessful.

This example demonstrates the criticality of maintaining the titania-coating reaction at a pH of 2.0 or below.

Following the procedure outlined in Example III, 27 milliliters of tetramethyl titanate may be added to a 35% salt-free aqueous silica sol to produce a stable titania-coated silica sol containing 26% titania. Likewise, if 65.7 milliliters of tetraphenyl titanate are used as a starting hydrolyzable organic titanium source in the above experiment a similar titania-coated silica sol is produced.

All the products of the foregoing examples may be conveniently concentrated up to about 60% by weight solids, by well-known evaporation techniques.

The above examples show that only by the use of a proper acid stabilizer can stable silica sols be produced which have coated thereon a considerable amount of titania. Extreme sedimentation and precipitation or complete gellation occur when the acid stabilizer is not added either before and/or during the addition of the hydrolyzable organic titanium compound to the silica sol.

Compositions of the invention all possess the requisite stability and ability to be dispersed in a wide variety of vehicles. For example, the products may be used as a water dispersible pigment used in air dryable, oxidizable vehicles. Other valuable properties such as whiteness, color retention, high degree of opacity, flexural strength, chalking properties, self-cleaning power, and good colloidal stability desirable when combined with good wetting and dispersibility properties, make them extremely valuable additives in paints, paper, plastics, rubber, ceramics and porcelain enamels.

In addition to the above properties and compositions all fall within viscosity range consistent with practically any mechanical process which may be selected for the dispersion operation. Besides their use as pigments and whitening agents, the compositions may also be used as delusterizing agents.

In many of the industrial applications in which titania is used (usually as $TiO_2$) the compositions of the invention may be substituted at a considerable saving. For example, they may be used as components for electronic equipment, to alter electrical characteristics or processing properties, as additives to welding-rod coatings and as batch additives in manufacture of glass fibers or of paper. The solid titania-coated silica particles may also be used in the manufacture of temperature sensitive electrical resistors and photoconductors.

What we claim is as follows:

1. The method of producing a stable titania-coated silica sol which comprises the steps of adding a water-insoluble hydrolyzable organic titanium compound to an acid stabilized silica sol with a pH of less than 2.0, said silica sol having as its dispersed phase dense, spherical, discrete particles of silica and as its continuous phase an aqueous liquid, said dispersed phase comprising from 1.0–60% of the total weight of the silica sol, agitating said stabilized silica sol during addition of said titanium compound and heating the resultant solution from about 50–100° C. for at least ¼ hour while maintaining said pH value, said hydrolyzable organic titanium compound being added in a sufficient amount to coat said silica particles with 5.0–60% by weight of titania expressed as $TiO_2$ based on the weight of silica expressed as $SiO_2$.

2. The method of claim 1 wherein the hydrolyzable organic titanium compound is selected from the group consisting of tetraalkyl titanates and tetraphenyl titanate.

3. The method of claim 1 wherein the hydrolyzable organic titanium compound is a tetraalkyl titanate containing alkyl chains of less than 5 carbon atoms.

4. The method of claim 1 wherein the starting silica sol is an aqueous silica sol containing silica particles less than 150 millimicrons in diameter, which comprise 10–40% by weight of the sol, and the hydrolyzable organic titanium compound is a tetraalkyl titanate containing alkyl chains of less than 5 carbon atoms.

5. The method of claim 1 wherein the hydrolyzable titanium compound is added in 2–4 equal incremental portions to the silica sol with repetition of said heating subsequent to each said incremental addition.

6. The method of claim 1 wherein the starting silica sol is an aqueous, substantially salt-free silica sol containing silica particles less than 150 millimicrons in diameter, and the hydrolyzable organic titanium compound is tetrabutyl titanate.

References Cited by the Examiner

UNITED STATES PATENTS 3,007,878    11/1961    Alexander et al. _____ 252—313

JULIUS GREENWALD, *Primary Examiner.*